United States Patent [19]

Dougherty

[11] 3,719,773

[45] March 6, 1973

[54] IMAGE TRANSDUCING SYSTEM

[75] Inventor: Charles B. Dougherty, Torrance, Calif.

[73] Assignee: TRW Inc., Redondo Beach, Calif.

[22] Filed: Dec. 27, 1971

[21] Appl. No.: 212,536

[52] U.S. Cl. ..................178/6, 178/7.1, 178/DIG. 28

[51] Int. Cl. ..............................................H04n 1/10

[58] Field of Search .........178/6, 7.1, 11, 13, DIG. 28

[56] References Cited

UNITED STATES PATENTS

| | | | |
|---|---|---|---|
| 295,219 | 3/1884 | Absterdam | 178/13 |
| 630,151 | 8/1899 | Whitehall | 178/13 |
| 1,728,986 | 9/1929 | Stokes | 178/7.1 |

*Primary Examiner*—Howard W. Britton
*Attorney*—Daniel T. Anderson et al.

[57] ABSTRACT

A photographic film is formed by winding a photosensitive filament sinuously on a backing plate. The filament is weakly adherent to the backing plate. After image exposure, the filament is peeled off the backing plate and drawn lengthwise through a developer and then through a photocell reader to convert the image to a corresponding electrical signal. The electrical signal is transmitted to another station where it is processed to reconstruct the original image.

10 Claims, 1 Drawing Figure

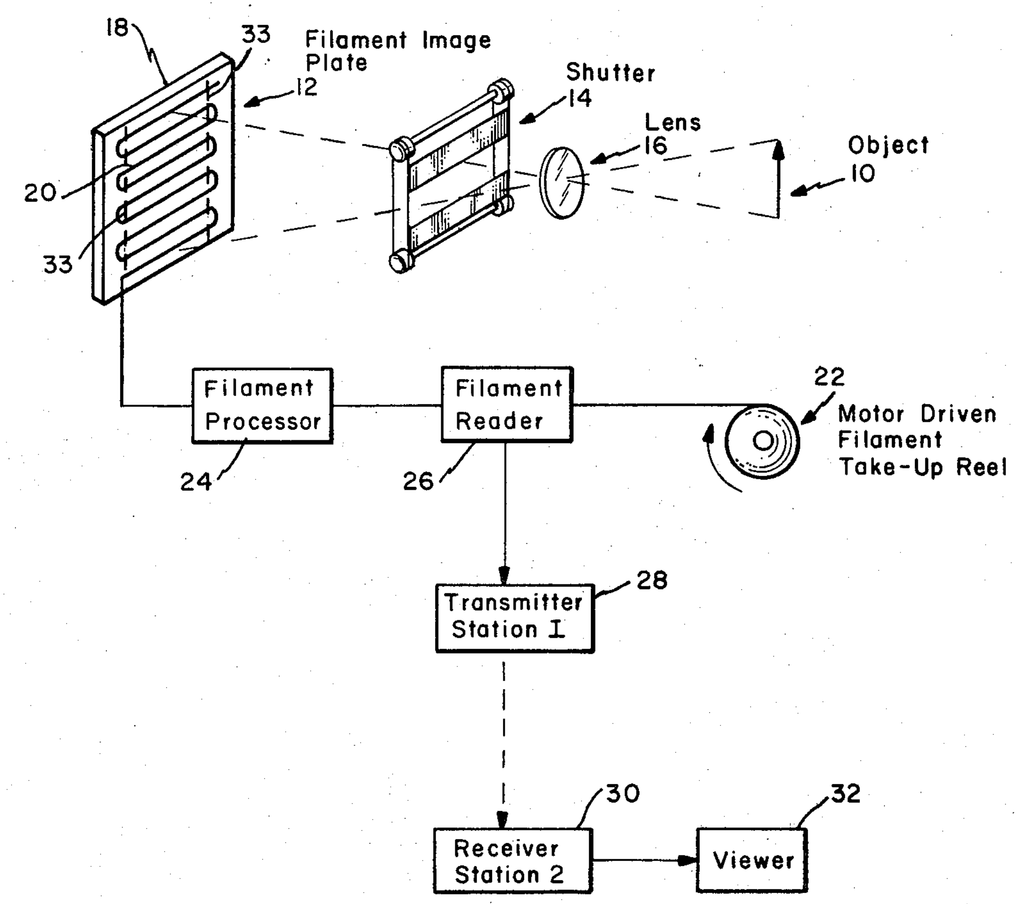
18
33
Filament Image Plate
12
Shutter
14
Lens
16
Object
10
20
33
Filament Processor
24
Filament Reader
26
22
Motor Driven Filament Take-Up Reel
Transmitter Station I
28
Receiver Station 2
30
Viewer
32

IMAGE TRANSDUCING SYSTEM

BACKGROUND OF THE INVENTION

1. Field of the Invention

This invention relates to imaging systems and has particular usefulness in applications where it is desired to record an image at one station and then transmit the recorded image to another station and there reproduce the image.

2. Description of the Prior Art

There are many instances when it is desired to take a picture of an event at one remote location without requiring an operator in attendance, and thereafter transmitting the picture to a second station where it is received and reconstructed. For some applications requiring only a single frame of picture information from time to time, closed circuit or remote television would be too expensive.

SUMMARY OF THE INVENTION

In accordance with the invention there is provided an image recording surface composed of a single filament that is wound many times in raster-like fashion along the length and width of the image area. The filamentary image surface is capable of receiving and storing a single frame of an optical image, and may be a photographic film or simply a writing surface capable of receiving pencil or ink markings.

Means are provided for mechanically unwinding the filament from the image surface after the single frame of picture information is recorded. The filament is then scanned lengthwise element by element to read the written information, such as by feeding it through a photoelectric cell, to develop an electrical signal representative of the recorded optical image. The electrical signal containing the recorded optical information is then transmitted to a second station where it is received and reconverted to the optical image.

BRIEF DESCRIPTION OF THE DRAWING

The single FIGURE is a diagrammatic view showing an imaging system according to the invention.

DESCRIPTION OF THE PREFERRED EMBODIMENTS

Referring now to the drawings, there is shown a diagrammatic view illustrating an embodiment of the invention wherein a photographic image recorded at one station is processed and transmitted to a second station where the image is reconstructed and viewed. The system illustrated may be used for fingerprint identification, signature verification, intruder detection, or any other similar application where it is desired to take only a single picture frame or exposure and transmit it to another location. In the drawing, the numeral 10 represents an object which is to be photographed by exposure on a filament image plate 12. The light exposure may be controlled by a shutter mechanism 14 which can be tripped by a sensing device when the object 10 approaches within a given field of view. The sensing device, not shown, may be of the photoelectric or of the pressure sensitive type. The image of the object 10 is focused on the filament image plate 12 by a lens 16.

The filament image plate 12 comprises a rigid backing member 18 of glass, plastic, metal or the like, supporting on the front face thereof a photographic film composed of a filament 20. The filament 20 is wound back and forth sinuously or in raster-like fashion over the surface of the backing member 18. The filament 20 is attached to the backing member 18 by a weak adhesive so that it can be peeled off by a light tugging force applied to one end thereof.

The turns of the filament 20 are wound close together so as to touch one another. Typically, the filament 20 may have a width or diameter of about 0.01 inch and may cover an area of 2 inches by 2 inches, providing a 200 line raster and a total filament length of 400 inches.

The filament core may be made of metal wire or plastic thread or other suitable material that will not stretch when pulled. The filament core may be coated with a conventional light sensitive coating or emulsion of the silver halide type.

After exposure, the filament 20 is removed from the backing member 18, turn by turn, by winding it slowly on a take-up reel 22. The take-up reel 22 may be driven by a motor that is actuated from the same sensing device used for actuating the shutter mechanism 14, with a slight delay in starting the motor being provided to allow the picture to be taken.

As the filament 20 is peeled off the backing member 18 and before the exposed filament is wound on the take-up reel 22, it is drawn through a filament processor 24 and then through a filament reader 26. The filament processor 24 may contain a conventional photographic developer fluid for developing the photographically exposed filament 20. The filament may be drawn through the developer at a rate of about 3 inches per second.

Alternatively, the filament 20 itself may contain the developer encapsulated in tiny spheres which are crushed to release the developer fluid by drawing the filament between two rollers.

The developed filament 20 passes through the filament reader 26, which may be a photocell or phototube that converts an optical input signal into an electrical output signal. The optical input may be derived by detecting the transmission through or the reflection from, the exposed filament, of light projected on the filament. Alternatively, the reader 26 may sense the electrical resistance of the exposed filament and convert the resistance variations into an electrical signal.

In either case, the electrical signal output from the filament reader 26 is fed to a low frequency radio transmitter 28 which is modulated at a low audio rate by the electrical signal and transmits the signal to a receiver 30 located at a remote station. At the second station, the receiver 30 demodulates the received signal and feeds the signal information to a viewer 32 where the optical image is reconstructed.

Reproduction of the image at the remote viewing station can be accomplished by a variety of well-known techniques; the technique to be chosen in a particular configuration depending on factors such as cost, permissible reconstruction time, fidelity of representation, portability requirements, and environment. As one example, a television-type receiver could be fabricated where the electronic signal is recorded at slow speed on a storage tube or magnetic medium and then read at high speed for repetitive, flicker free, presentation on a cathode ray tube. Another technique would be to scan a light sensitive material, which would be subsequently developed, with a point light source whose intensity would be modulated by the incoming signal. Regardless of the reproduction procedure employed, it is envisioned that the readout filament 20 will be pre-indexed at the beginning and end of each horizontal filament segment, as indicated by broken lines 33, so that synchronizing signals for the reproduction device will be imposed on the transmitted signal. This pre-indexing can be accomplished during fabrication of the filament image plate by overprinting, with light or ink, a coded line structure along each horizontal edge.

Where the image is a fingerprint or a personal signature, it may be preferred to print the image with ink directly on the filament 20 instead of printing it photographically. In this case, the filament 20 may dispense with the photosensitive coating, and instead it may comprise a thread of textile material or the like which can be inked easily.

Several layers of the filament 20 may be incorporated on the filament image plate 12 to permit additional pictures to be made. A limiting factor as to the number of photosensitive layers which can be made is the defocussing of the image as the layers are peeled off and the distance between the lens and the photosensitive surface increases.

What is claimed is:

1. Image transducing system, comprising:

a. an image surface capable of receiving and storing an image thereon at a first station and composed of a continuous filament of extended length wound sinuously along the length and width of said image surface;

b. means for unwinding said filament from the image surface after receipt of an image thereon; and c. means for scanning said filament lengthwise to read the image information thereon element by element and develop an electrical signal representative of the image.

2. The invention according to claim 1, and further including a rigid backing member on which said filament is adherent and removably attached by peeling it therefrom along its length.

3. The invention according to claim 1, wherein said filament comprises photographic film.

4. The invention according to claim 1, wherein said filament comprises a thread of material capable of being marked indelibly with ink or the like.

5. The invention according to claim 1, and further including:

d. means for transmitting said electrical signal to a second station removed from said first station.

6. The invention according to claim 5, and further including:

e. means at said second station for receiving said electrical signal and for reconstructing said image therefrom.

7. Photographic imaging apparatus, comprising:

a. a backing member;

b. a filamentary photographic film covering a surface of said backing member and adherent thereto but capable of detachment therefrom by peeling away the film;

c. means for temporally exposing said photographic film on said backing member to an optical image projected thereon;

d. means for developing said filamentary film;

e. means for reading said film to develop an electrical signal corresponding to the optical image stored thereon; and f. means for peeling said film away from backing member and feeding it linearly through said developing means and said reading means in sequence.

8. The invention according to claim 7, wherein said photographic filamentary film includes developer fluid encapsulated therein.

9. The invention according to claim 7, wherein said reading means comprises photoelectric transducer means for converting the optical image stored in said film to a corresponding electrical signal.

10. The invention according to claim 9, and further including a radio frequency transmitter to which said electrical signal is fed to develop a modulated radio frequency signal for transmission to a station removed from said transmitter.

* * * * *